United States Patent
Kearney

[11] 3,867,237
[45] Feb. 18, 1975

[54] PEAR TREE DECORATION
[76] Inventor: Patricia A. Kearney, R.R. No. 1, Box 13, Bradley, S. Dak. 57217
[22] Filed: Dec. 1, 1972
[21] Appl. No.: 311,144

[52] U.S. Cl.......................... 161/24, 35/73, 46/116, D 29/1 A
[51] Int. Cl........................................... A47g 33/06
[58] Field of Search............. 161/24, 22, 25, 19, 12; 40/28; D29/1 A B; 46/116; 35/73, 7

[56] References Cited
OTHER PUBLICATIONS
Fuller, "The twelve days of Christmas," Better Homes & Gardens December 1955, pp. 1, 16, 17, 156, 157, 162, 163, 188, 189.

Toy Fair Catalog–Hobby Craft Kits, (1970), Arrow handicraft Corp., p. 9.

Primary Examiner—William E. Schulz
Attorney, Agent, or Firm—Robert E. Kleve

[57] ABSTRACT

The invention comprises a decoration and a method of assembling the decoration. The decoration has artificial minature pear tree. The pear tree has detachable branches and twelve numbered packages containing artificial minature items corresponding to the items referred to in the Christmas carol. "The Twelve Days of Christmas." The method of assembly is to assemble the tree and open one of the packages each day in numbered succession and attach the items in the package to the pear tree.

1 Claim, 6 Drawing Figures

PATENTED FEB 18 1975　　　　　　　　　　　　　　3,867,237
FIG. 1.
FIG. 2.
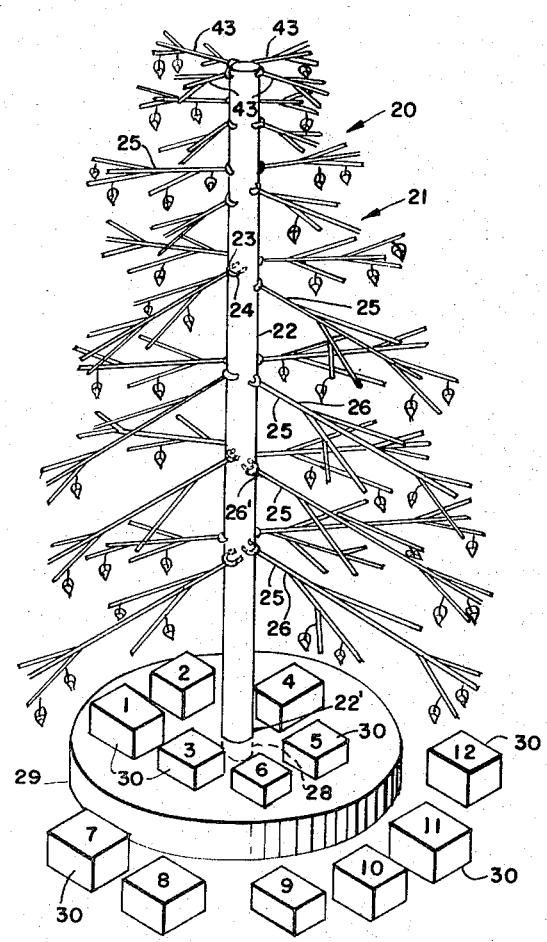
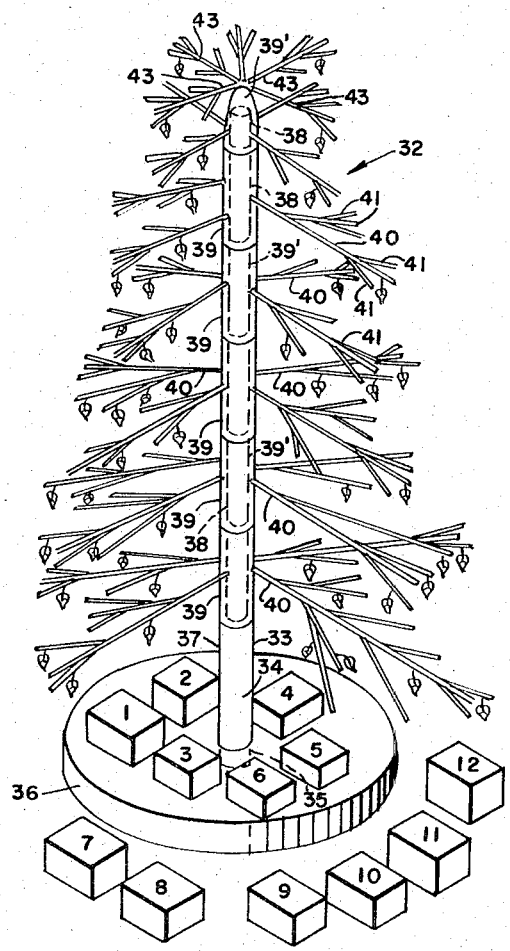
FIG. 5.
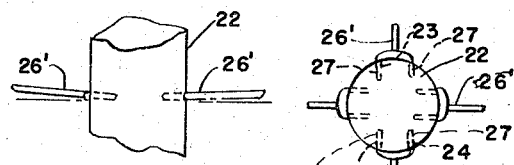
FIG. 6.
FIG. 3.
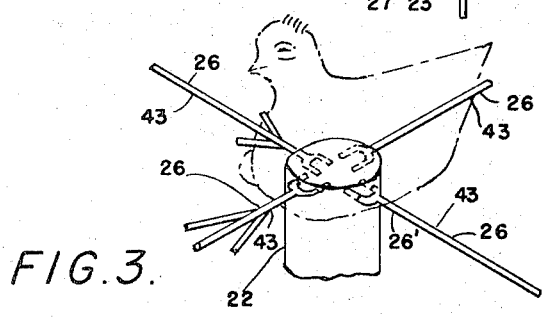
FIG. 4.
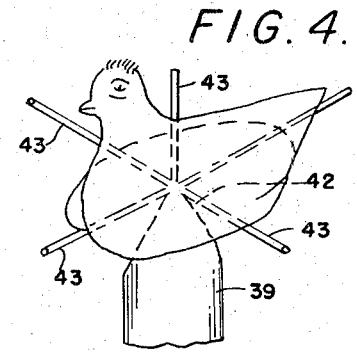

PEAR TREE DECORATION

This invention relates to decorative items, more particularly, the invention relates to decorative or novelty items.

It is an object of the invention to provide a novel artificial minature pear tree which can be easily and quickly assembled which is employed in connection with packages containing minatures items referred to in the coral "The Twelve Days of Christmas."

It is another object of the invention to provide a novel pear tree and gift novelty for children.

It is another object of the invention to provide a novel minature artificial pear tree and gift kit having a minature pear tree with 12 numbered packages containing items referred to in the coral "Twelve Days of Christmas," with one package to be opened each day of the 12 days during Christmas as a novelty item for children.

It is another object of the invention to provide a novel artificial pear tree having detachable branches which are nonrotatable relative to the tree, so that minature items referred to in the coral "The Twelve Days of Christmas" may be attached to the artificial tree and they will not cause the branches to rotate.

Further objects and advantages of the invention will become apparent as the description proceeds and when taken in conjunction with the accompanying drawing wherein:

FIG. 1 is a perspective view of the first preferred form of artificial pear tree with the detachable branches of the tree each having a pair of prongs at their inner ends which are receiving in pairs of holes in the pole of the tree and with the twelve packages referring to the song "The Twelve Days of Christmas" located below the tree.

FIG. 2 is a perspective view of the modified form of artificial pear tree with the tree having a pole with a series of stacked detachable collars with the branches of the tree fixed to the collars and with twelve packages positioned beneath the tree referring to the song "The Twelve Days of Christmas."

FIG. 3 is a fragmentary enlarged view of the top of the first form of artificial pear tree with the top branches adapted to receive an artificial minature partridge.

FIG. 4 is a fragmentary enlarged view of the modified form of pear tree with the top branches adapted to receive an artificial minature partridge.

FIG. 5 is an enlarged fragmentary view of the pair of prongs at the inner end of the branches, shown slidably attached to the center pole of the tree.

FIG. 6 is a cross-sectional view taken along line 6—6 of FIG. 1.

Briefly stated, the invention comprises a minature artificial pear tree with quickly attachable branches and has twelve numbered gift packages containing the minature artificial items referred to in the coral "Twelve Days of Christmas". The package numbered No. 1 contains a number of artificial minature pears for attachment to the tree and an artificial minature partridge. Package No. 2 contains two minature turtle doves, etc.

Referring more particularly to the drawings in FIG. 1, artificial pear tree and gift kit invention 20 is illustrated. The gift kit invention 20 has a minature artificial pear tree 21. The artificial tree 21 has an upright cylindrical wooden pole 22. The pole has a plurality of pairs of spaced holes 23 and 24. Each pair of spaced holes 23 and 24 are spaced the same distance apart from one another. A plurality of wire rod branches 25 have a long main metal wire rod 26 which forms the main branches and a plurality of short metal wire rods with four subsidiary branches and are welded or otherwise fixed to the main branch member 26 of each branch 25. The inner ends 26' of each branch has a pair of short wire prongs 27 and 27' fixed thereto and fixed in spaced relation to one another. Each pair of prongs 27 and 27' is spaced the same distance apart from one another and are also spaced the same distance apart from one another as each pair of holes 23 and 24 are spaced from one another, so that any pair of prongs 27 and 27' from any one of the branches 25 may be received in any one of the pair of holes 23 and 24 on the pole 22. The branches 25 are short in relation to one another from top to bottom, so that when they are attached to the holes in the pole, the branches will give the pole the similated appearance of a pear tree. The lower end 22' of the pole is fixed in a bore 28 and a wooden disc 29. The wooden disc 28 will be placed on a flat horizontal surface and will serve as a base support for supporting the tree 21 upright upon a flat horizontal surface.

Twelve packages 30, numbered 1–12 inclusive, are placed at the base of the tree 21. The packages contain minature items in plastic or clay. The package No. 1 contains 12 artificial minature pears and a minature artificial plastic or clay partridge. The package No. 2 contains two minature artificial turtle doves. The package No. 3 contains three minature artificial French Hens. The package No. 4 contains four minature artificial calling birds. The package No. 5 contains five minature artificial gold rings. The package No. 6 contains six minature artificial geese a laying. The package No. 7 contains seven minature swans. The package No. 8 contains eight minature artificial maids a milking. The package No. 9 contains nine minature artificial ladies dancing. The package No. 10 contains 10 minature artificial lords a leaping. The package No. 11 contains 11 minature artificial pipers piping. The package No. 12 contains 12 minature artificial drummers drumming. The items in the package thus correspond to the items referred to in the Christmas carol "The Twelve Days of Christmas." The items in the package may be artificial and made of clay, plastic, or other materials.

It is intended that the package No. 1 containing the pears and partridge will be opened on December 13. The package No. 2 will be opened on December 14th. The package No. 3 will be opened on December 15th, and so on with another package opened each day in numbered succession so that the package No. 12 will be opened on the 12th day after starting on December 13th.

The kit invention 20 designed principally for the entertainment of children, with young children particularly enjoying the excitement of each day placing a new set of decorations or items in the package 30 onto the pear tree 21, starting on December 13th and ending on December 24th, Christmas Eve.

By each days decoration being separately packaged in the numbered packages 1–12, it provides daily excitement for the children to keep them entertained during the Christmas season, by being able to open one package each day and placing the items on the tree starting with the pears and partridge and ending with the minature artificial figures of drummers. When all the items in all 12 packages have been attached to the tree, it may also be used as a center piece for a table.

It is intended that the tree be only approximately 3-4 feet in height and the items or figures in the package will be 1-4 inches in height.

The branches 25 are detachable from the pole 22 and the pole is slidably removable from the bore 28 in the disc 29, so that the tree may be stored in a compact manner. Also, it is intended that the kit be reuasable from year to year.

A modified form of pear tree 32 is illustrated in FIG. 2. The modified pear tree 32 has a center pole 33. The center pole has its lower end 34 slidably inserted in a bore 35 in a disc 36, so that the disc 36 serves as a base support from the tree in the same manner as in the first form of pear tree.

The lower end of the pole 33 has an enlarged shoulder portion 37. An elongated cylindrical pole portion 38 extends coaxially upward from the shoulder portion 37. Five cylindrical collars 39 each has a center bore 39' slightly larger than the outside diameter of the pole portion 38 so as to be slidably telescoped onto the pole portion 38 in stacked relationship one above the other, as illustrated in FIG. 2.

The collars 39 each has a plurality of wire rods 40 with their inner ends fixed to the collars and their outer ends projecting radially outwardly from the collar at various locations about the circumference of the collar 39. A plurality of shorter metal rods 41 are welded to the main wire rods 40 at various locations so that the wire rods within their shorter wires 41 take on the appearance of the branches of a tree.

The branches are located at intervals about the circumference of the collars so that when the collars are stacked, as illustrated in FIG. 2, the assembly has the appearance of a tree intended to be a pear tree.

The top collar 39' has a molded point 42. The branches 40 on the collar are progressively shorter with the longer branches at the bottom to further give the appearance of a tree.

The tree may be quickly assembled by inserting the pole 33 into the bore 35 in disc 36 and sliding the collars 39 onto the pole portion 38 and may be quickly disassembled by sliding the collars 39 off and removing the pole 33 from the disc 36.

The branches 43 at the top of the pear tree in the first form of pear tree and in the second form of pear tree are generally of the same height with respect to one another, about the circumference of the center pole, as illustrated in FIGS. 3 and 4, so that the branches will support a minature artificial partridge resting upon the top branches, as illustrated in FIGS. 3 and 4.

The branches on both forms of the pear tree have artificial pear tree leaves attached to the branches.

The minature items in the twelve packages will be of a design and size to be conveniently hung on the tree, while the minature partridge will simply be nested at the top of the tree rather than suspended on the tree. Suitable hooks may be mounted on the items for conveniently attaching the items to the tree.

Also, a phonograph recording of the Christmas carol "The Twelve Days of Christmas" may be included in the kit invention.

Thus, it will be seen that a novel decorative gift kit invention has been provided which will provide entertainment for children during the Christmas season.

It will be obvious that various changes and departures may be made to the invention without departing from the spirit thereof and accordingly it is not intended that the invention be limited to that specifically described in the specification or as illustrated in the drawings but only as set forth in the appended claims.

What is claimed is:

1. An artificial topless pear tree, said tree comprising a flat base, an upright pole mounted into said base and projecting vertically upward, a relatively broad branch-like platform at the top of the tree, said platform comprising at least three elongated branch poles each having its inner ends detachably engaging the top of the pole and projecting radially outward with each one having portions at least slightly inclined upward from horizontal to form a flat branch-like platform at the top of the pole, so that a relatively flat topless tree is formed at the upper end of the tree, an artificial partridge resting centrally on the topless branch-like platform at the top of the tree, a plurality of branch poles beneath said top branch poles projecting radially outward, at spaced intervals toward the bottom of the tree, and progressively larger, in relation to one another, in a direction toward the bottom of the tree.

* * * * *